United States Patent
Echigoya et al.

[11] Patent Number: 5,971,290
[45] Date of Patent: Oct. 26, 1999

[54] HEAT EXCHANGE SYSTEM FOR ELECTRIC VEHICLE

[75] Inventors: Hiroshi Echigoya, Utsunomiya; Shunya Jinnai, Tochigi-ken, both of Japan

[73] Assignee: Honda Giken Kogyo Kabushiki Kaisha, Tokyo, Japan

[21] Appl. No.: 09/069,936

[22] Filed: Apr. 30, 1998

[30] Foreign Application Priority Data

Apr. 30, 1997 [JP] Japan .................................. 9-112085
Apr. 30, 1997 [JP] Japan .................................. 9-112086

[51] Int. Cl.⁶ ............................................... B60H 1/02
[52] U.S. Cl. ................................ 237/12.3 B; 237/12.3 A
[58] Field of Search ................ 237/12.3 B, 12.3 A, 237/2 A

[56] References Cited

U.S. PATENT DOCUMENTS

| | | |
|---|---|---|
| 5,273,105 | 12/1993 | Higashihara et al. .................. 237/2 A |
| 5,366,150 | 11/1994 | Kaimoto et al. ........................ 237/2 A |
| 5,407,130 | 4/1995 | Uyeki et al. ............................ 237/2 A |
| 5,497,941 | 3/1996 | Numazawa et al. .................... 237/2 A |
| 5,549,153 | 8/1996 | Baruschke et al. ................. 237/12.3 B |
| 5,678,760 | 10/1997 | Muso et al. ............................ 237/2 A |
| 5,699,960 | 12/1997 | Kato et al. ............................. 237/2 A |
| 5,725,048 | 3/1998 | Burk et al. .......................... 237/12.3 B |

*Primary Examiner*—Henry Bennett
*Assistant Examiner*—Derek S. Boles
*Attorney, Agent, or Firm*—Birch, Stewart, Kolasch & Birch, LLP

[57] ABSTRACT

Disclosed is a heat exchange system for an electric vehicle, comprising a heating hot water circuit for heating, with hot water, air to a predetermined temperature before being discharged into a passenger's compartment, and a cooling circuit for cooling, with cooling water, a driving motor and a battery for supplying electric energy to the driving motor, wherein water supplement and drain operations are performed by using a single reserve tank for the hot water circuit and the cooling circuit.

8 Claims, 6 Drawing Sheets

HEAT EXCHANGE SYSTEM FOR ELECTRIC VEHICLE

BACKGROUND OF THE INVENTION

1. Field of the Invention

The present invention relates to a heat exchange system for use on an electric vehicle, provided with a hot water circuit to be used for air-conditioning heating operation for previously heating, with hot water, air to a predetermined temperature to be discharged into a passenger's compartment.

2. Description of the Related Art

In general, the electric vehicle adopts the heat pump system as a heat exchange system for air-conditioning heating operation, based on the use of a high temperature and high pressure cooling medium discharged from a compressor in a refrigerating cycle. In this system, the hot water, which serves as a heating medium, is allowed to circulate through a circulation pipe by the aid of a water pump. The hot water is heated by the high temperature and high pressure cooling medium, and it is supplied to a heater core. The air, which passes through the heater core, is heated to a predetermined temperature by means of heat exchange effected between the hot water and the air.

The electric vehicle uses a heat exchange system to be used for air-conditioning cooling operation for cooling a motor for driving the vehicle and a battery for supplying electric power to the driving motor. In the cooling heat exchange system, the cooling water is allowed to circulate through a circulation pipe which communicates with a circulation passage for cooling the driving motor and the battery disposed in a battery-accommodating box. The temperature of the cooling water is lowered by allowing the cooling water at a high temperature to pass through a heat exchanger such as a radiator so that heat exchange is performed between the cooling water and external air.

The heating heat exchange system generally comprises a reserve tank which is branched from the circulation pipe, in conformity with the requirement for water supply and increase in water pressure caused by the increase in water temperature in the circulation pipe. The heating heat exchange system is devised such that the hot water is drained and supplemented by appropriately using the circulation pipe and the reserve tank. On the other hand, the cooling heat exchange system is provided with a reserve tank which communicates with the heat exchanger, because of the same reason as described above.

However, the hot water circuit for the heating heat exchange system is provided independently from that for the cooling heat exchange system, and the respective reserve tanks are disposed individually, because of the following reason. That is, in the case of the heating heat exchange system, the water temperature setting is 60° C. to 80° C. in a region ranging from the circulation pipe to the inside of the reserve tank in order to perform the air-conditioning heating operation. On the other hand, in the case of the cooling heat exchange system, the water temperature setting is not more than 60° C. in a region ranging from the circulation pipe to the inside of the reserve tank in order to perform the air-conditioning cooling operation.

Therefore, in the case of the electric vehicle, the water supply operation is performed for each of the reserve tanks provided individually for the heating heat exchange system and the cooling heat exchange system respectively. A problem is pointed out that the water supply operation is considerably complicated. Further, an inconvenience arises in that the production cost and the installation space are increased because the two reserve tanks are used.

The heating heat exchange system includes the reserve tank which is branched from the circulation pipe. Therefore, the reserve tank has no air-vent function, although the heat loss due to heat radiation from the reserve tank is decreased. For this reason, it is necessary to separately provide an air-vent valve at an intermediate position of the pipework. A problem is pointed out that the structure of such a heating heat exchange system is complicated.

SUMMARY OF THE INVENTION

A general object of the present invention is to provide a heat exchange system for use on an electric vehicle, which makes it possible to unify a plurality of reserve tanks into one unit, and simplify the water supply operation and the structure of the system.

A principal object of the present invention is to provide a heat exchange system for use on an electric vehicle, which makes it possible to reliably perform air-vent operation with a simple structure, and decrease the heat loss as less as possible.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
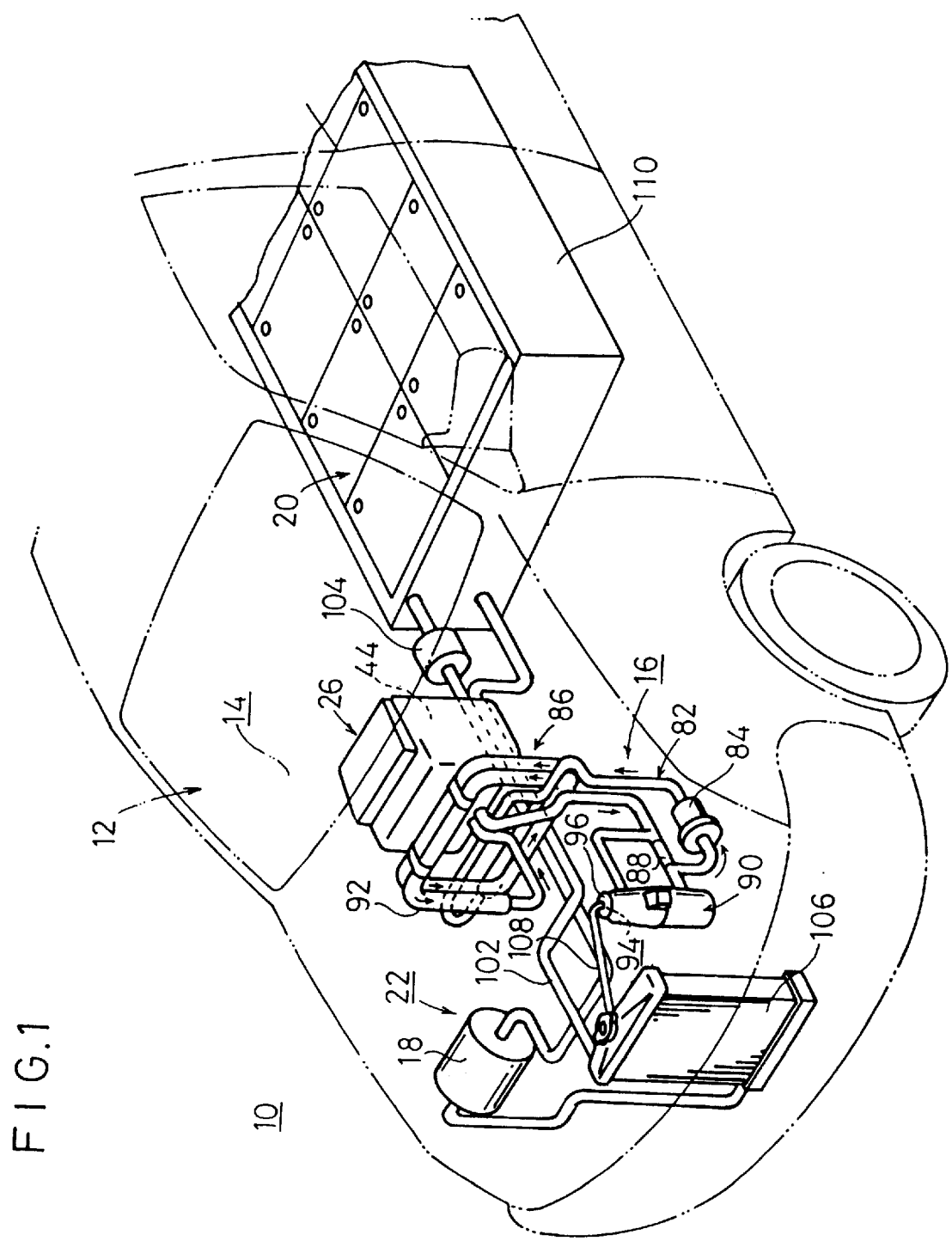
FIG. 1 is a schematic perspective view of a part of an electric vehicle into which a heat exchange system according to a first embodiment of the present invention is incorporated.

FIG. 1 is a schematic perspective view of a part of an electric vehicle 12 into which a heat exchange system 10 according to a first embodiment of the present invention is incorporated.

The heat exchanger system 10 comprises a heating hot water circuit 16 for heating, with hot water, air to a predetermined temperature before being discharged into a passenger's compartment 14, and a cooling circuit 22 for cooling, with cooling water, a driving motor 18 and a battery 20 for supplying electric energy to the motor 18.

Figure 2:
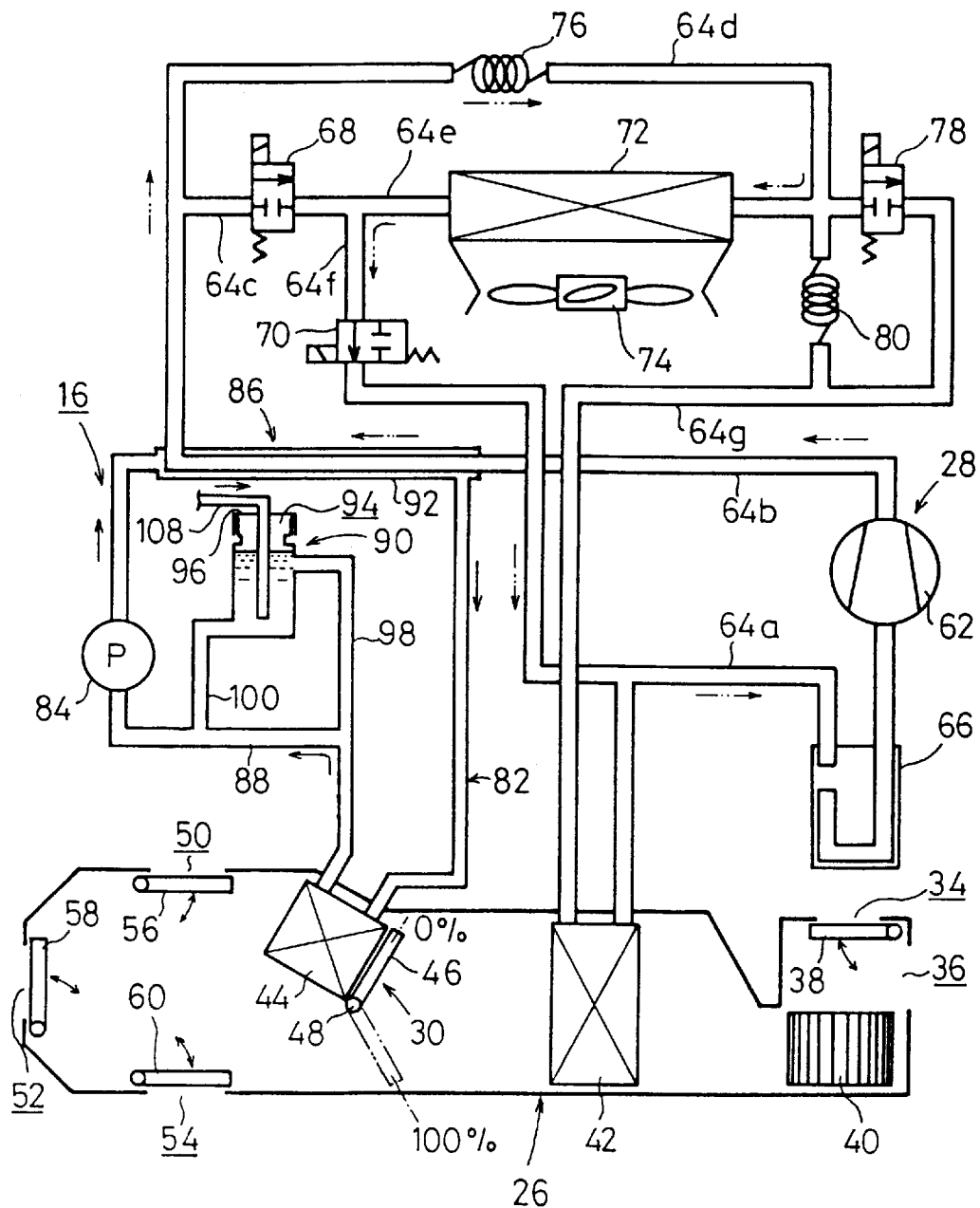
FIG. 2 is a schematic view, partly in block form, of an automatic air-conditioning system for use on the electric vehicle, into which a hot water circuit for constructing the heat exchange system is incorporated.

As shown in FIG. 2, the hot water circuit 16 is incorporated into an automatic air-conditioning system 24. The automatic air-conditioning system 24 has a duct 26 for discharging temperature-controlled and humidity-controlled air into the passenger's compartment 14 of the electric vehicle, a cooling medium circuit 28 for cooling the air flowing through the duct 26 through heat exchange between the air and a coolant, the hot water circuit 16 for heating the air flowing through the duct 26 through heat exchange between the air and hot water, and an air-mixing unit 30 disposed in the duct 26 for mixing and controlling cool air and hot air.

The duct 26 is disposed in front of the passenger's compartment 14 with an instrumental panel (not shown) interposed therebetween. The duct 26 has on its upstream end an interior air inlet 34 for introducing air from an interior space in the passenger's compartment 14 and an exterior air inlet 36 for introducing from an exterior space outside of the passenger's compartment 14, the interior air inlet 34 and the exterior air inlet 36 being selectively openable and closable by a switching damper 38.

In the duct 26, there are disposed an air blower 40 closely to the switching damper 38 and an evaporator 42 positioned downstream of the air blower 40, the evaporator 42 being part of the cooling medium circuit 28. The duct 26 also houses therein a heater core (first heat exchanger) 44 disposed downstream of the evaporator 42, the heater core 44 being part of the hot water circuit 16. The air-mixing unit 30 is mounted on an inlet side of the heater core 44. The air-mixing unit 30 has an air-mixing damper 46 which can be angularly moved to any desired angular position within an angular range from an angular extent 0% to an angular extent 100% by an air-mixing motor 48 coupled to the air-mixing damper 46.

The duct 26 has in its downstream end portion a defrosting outlet 50 for discharging air against the inner surface of a front windshield of the electric vehicle, a face outlet 52 for discharging air against the head of a passenger in the passenger's compartment, and a foot outlet 54 for discharging air against the feet of the passenger. The defrosting outlet 50, the face outlet 52, and the foot outlet 54 are associated respectively with a defrosting damper 56, a face damper 58, and a foot damper 60 which are angularly movable to open and close the defrosting outlet 50, the face outlet 52, and the foot outlet 54, respectively.

The evaporator 42 serves to evaporate a cooling medium flowing into the evaporator 42 and also to cool air which is introduced into the duct 26 by the air blower 40, through heat exchange between the air and the cooling medium. The cooling medium circuit 28 which includes the evaporator 42 includes an electric compressor 62 having an inlet port connected to an outlet port of the evaporator 42 by a cooling medium pipe 64a which is disposed on a low pressure side and which has an accumulator 66. The electric compressor 62 compresses the cooling medium (gas coolant), drawn thereinto through the inlet port thereof, and it discharges a high-temperature, high-pressure cooling medium from an outlet port thereof into a cooling medium pipe 64b. The accumulator 66 separates the cooling medium into a liquid coolant and a gas coolant, and it supplies only the gas coolant to the electric compressor 62.

The cooling medium pipe 64b has an end portion branched into cooling medium pipes 64c, 64d, and the cooling medium pipe 64c is branched into cooling medium pipes 64e, 64f. The cooling medium pipe 64c has a first solenoid-operated valve 68, and the cooling medium pipe 64f has a second solenoid-operated valve 70. The cooling medium pipe 64f is connected to the cooling medium pipe 64a. The cooling medium pipe 64e has an exterior heat exchanger 72 which serves to evaporate a low-temperature, low-pressure cooling medium in a gas-liquid phase through heat exchange between the cooling medium and exterior air applied by an exterior fan 74 when the automatic air-conditioning system 24 operates in a heating mode to heat the passenger's compartment, and also to condense a high-temperature, high-pressure gas coolant into a liquid through heat exchange between the gas coolant and exterior air applied by the exterior fan 74 when the automatic air-conditioning system 24 operates in a cooling mode to cool the passenger's compartment.

The cooling medium pipe 64d is arranged with a first capillary tube 76 to be used for heating. The cooling medium pipes 64d, 64e are joined into a cooling medium pipe 64g which is connected to the inlet port of the evaporator 42. The cooling medium pipe 64g is provided in parallel to a third solenoid-operated valve 78 and a second capillary tube 80 to be used for cooling.

The hot water circuit 16 comprises a first water pump 84 for circulating hot water through a first circulation pipe 82, a heating unit 86 such as a heat exchanger for heating the hot water which is allowed to circulate through the first circulation pipe 82, a heater core 44 for heating air by means of heat exchange effected between the hot water and the air in the duct 26, and a reserve tank 90 which is arranged in parallel to a pipe 88 included in the first circulation pipe 82 and which is disposed over the pipe 88. A fuel-combustion heater (not shown) may be arranged for the first circulation pipe 82, if necessary.

The heating unit 86 includes an outer conduit 92 disposed around and extending a certain length along a portion of the cooling medium pipe 64b of the cooling medium circuit 28. When the high-temperature, high-pressure cooling medium discharged from the electric compressor 62 flows through the cooling medium pipe 64b, the heating unit 86 heats hot water through heat exchange between the cooling medium and the hot water flowing through the outer conduit 92.

The reserve tank 90 has a water supply port 94 disposed at its upper end. A cap 96 is mounted to close the water supply port 94. The hot water circuit 16 includes a first inflow bypass pipe 98 having its one end which communicates with the pipe 88 and another end which communicates with a portion located in the vicinity of the upper portion of the reserve tank 90, and a second inflow bypass pipe 100 having its one end which communicates with the pipe 88 and another end which communicates with a portion located in the vicinity of the lower portion of the reserve tank 90.

The pipe 88, which constitutes a parallel circuit with respect to the reserve tank 90 between the first and second bypass tubes 98, 100, is formed of a flexible resilient member having an identical diameter over its entire body.

Figure 3:
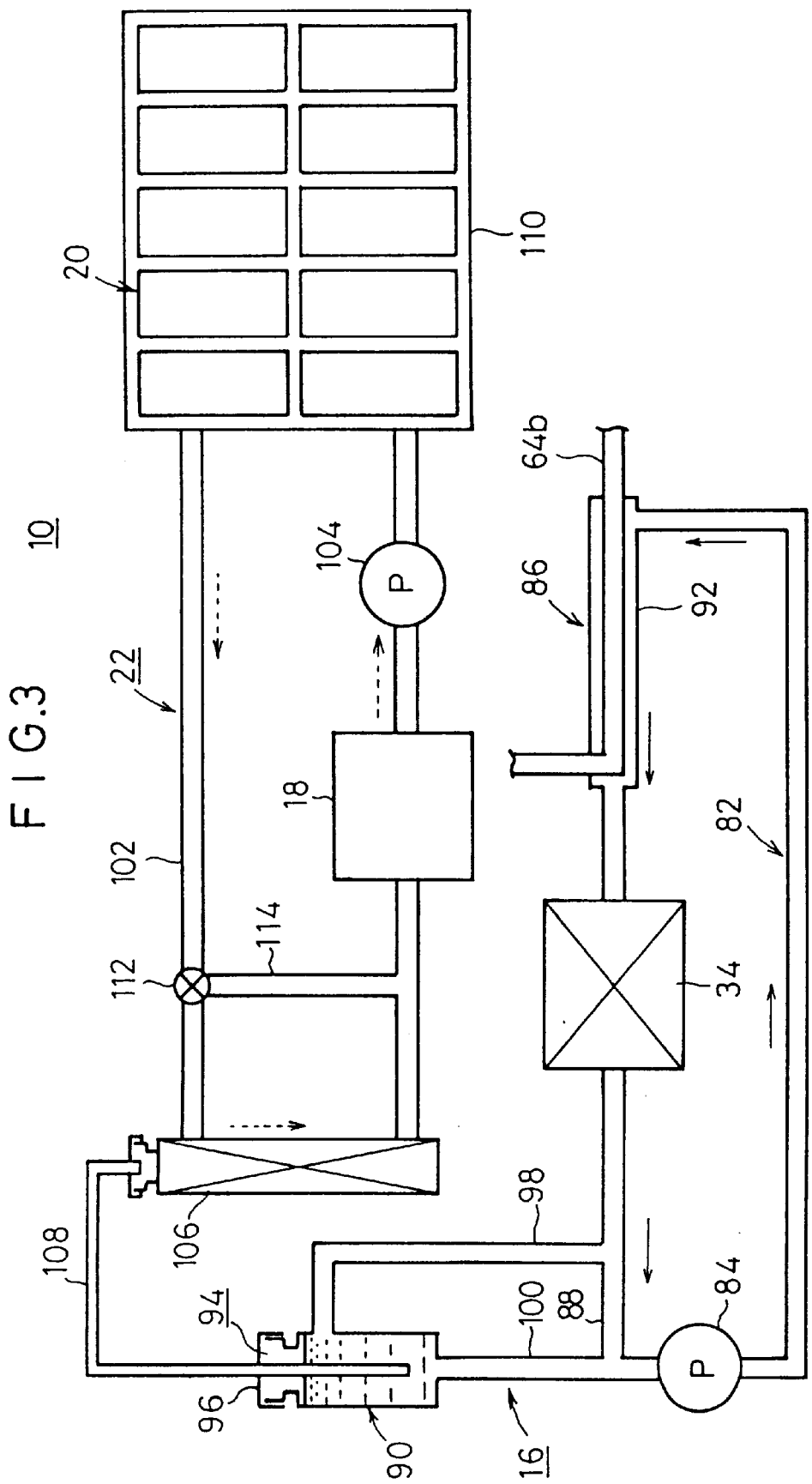
FIG. 3 is a schematic view, partly in block form, of the heat exchange system.

As shown in FIGS. 1 and 3, the cooling circuit 22 comprises a second water pump 104 for circulating cooling water through a second circulation pipe 102, a radiator (second heat exchanger) 106 for cooling the cooling water, and a water pipe 108 which makes communication between the upper portion of the radiator 106 and the reserve tank 90.

The battery 20 is accommodated in a battery-accommodating box 110. An unillustrated circulation pipe, which communicates with the second circulation pipe 102 for cooling the battery 20, is provided in the battery-accommodating box 110. The second circulation pipe 102 has a water pipe 114 which is branched at a three-port valve 112 in the vicinity of the radiator 106. The water pipe 108 has its one end which is connected to the upper portion of the radiator 106 and another end which is disposed in the vicinity of the bottom of the reserve tank 90, the water pipe 108 penetrating through the cap 96 of the reserve tank 90.

Operation of the heat exchange system 10 constructed as described above will be described below.

The states of various components of the cooling medium circuit 26 when the automatic air-conditioning system 24 is in a cooling mode, a heating mode, a dehumidifying mode, and an air blowing mode respectively are shown in Table 1 given below.

TABLE 1

| Mode of operation | Cooling | Heating | Dehumi-difying | Air blowing |
|---|---|---|---|---|
| Solenoid-operated valve 68 | Open | Closed | Closed | Closed |
| Solenoid-operated valve 70 | Closed | Open | Closed | Closed |
| Solenoid-operated valve 78 | Closed | Closed | Open | Closed |
| Capillary tube 76 | — | Through | Through | — |
| Exterior heat exchanger 72 | Through | Through | — | — |
| Capillary tube 80 | Through | — | — | — |
| Evaporator 42 | Through | — | Through | — |

When the operation mode is the heating mode, as shown in Table 1 and FIG. 2, the first and third solenoid-operated valves 68, 78 are closed, and the second solenoid-operated valve 70 is open. Therefore, the cooling medium discharged from the electric compressor 62 flows through the cooling medium pipes 64b, 64d into the first capillary tube 76 in which its pressure is reduced to produce a cooling medium in a gas-liquid phase. The cooling medium passes through the exterior heat exchanger 72 and is evaporated, after which the cooling medium passes through the second solenoid-operated valve 70 and the cooling medium pipes 64f, 64a into the accumulator 66, from which the cooling medium flows back to the electric compressor 62.

In the hot water circuit 16, the hot water is allowed to circulate through the first circulation pipe 82 by actuating the first water pump 84. The hot water is supplied to the outer conduit 92 of the heating unit 86. Consequently, when the high-temperature, high-pressure cooling medium flows through the cooling medium pipe 64b internally with respect to the outer conduit 92, it heats the hot water in the outer conduit 92. The hot water is introduced into the heater core 44 for thereby heating air that passes through the heater core 44 to a certain temperature.

As shown in FIG. 1, the electric vehicle 12 has the motor 18 which is actuated by the electric energy supplied from the battery 20. The cooling circuit 22 is operated in order to cool the battery 20 and the motor 18. That is, as shown in FIGS. 1 and 3, the cooling water is allowed to circulate through the second circulation pipe 102 in accordance with the operation of the second water pump 104. The cooling water, which has a high temperature after cooling the motor 18 and the battery 20, passes through the radiator 106, and thus it undergoes heat exchange with the external air. As a result, the cooling water has a low temperature.

The pipe 88, which is connected to the first and second bypass pipes 98, 100 in the hot water circuit 16, is designed to have a uniform diameter over its entire length. Accordingly, the circulation flow amount is identical at any portion in the pipe 88. The hydrostatic pressure acting on the reserve tank 90 is equal at connecting portions between the first and second bypass pipe 98, 100 and the pipe 88. Therefore, there is no difference in pressure between the inflow port and the outflow port of the reserve tank 90. The reserve tank 90 can be reliably prevented from inflow of the hot water circulating through the first circulation pipe 82. The temperature of water in the reserve tank 90 is not raised.

As for the cooling circuit 22, the water pipe 108, which has its one end connected to the upper portion of the radiator 106, has another end which is disposed in the vicinity of the bottom in the reserve tank 90. Accordingly, when the radiator 106 has a positive pressure at its inside, the water is drained from the radiator 106 through the water pipe 108 to the reserve tank 90. When the radiator has a negative pressure at its inside, the water is supplied to the radiator 106.

In the first embodiment, for example, when the hot water heated to 60° C. to 80° C. is allowed to circulate through the first circulation pipe 82 of the hot water circuit 16, the hot water does not flow into the reserve tank 90. Accordingly, the temperature of water in the reserve tank 90 is effectively maintained at a temperature not higher than 60° C. as desired for the cooling water for the cooling circuit 22.

Therefore, the single reserve tank 90 can be used for both of the hot water circuit 16 and the cooling circuit 22 which have different water temperatures respectively. The system of the present invention is effective in that the number of parts or components can be advantageously reduced as compared with those provided with reserve tanks exclusively used for the hot water circuit 16 and the cooling circuit 22 respectively. Further, it is enough that the water supply operation is performed only for the single reserve tank 90. Accordingly, the system of the present invention is advantageous in that the water supply operation is performed quickly and easily.

Figure 4:
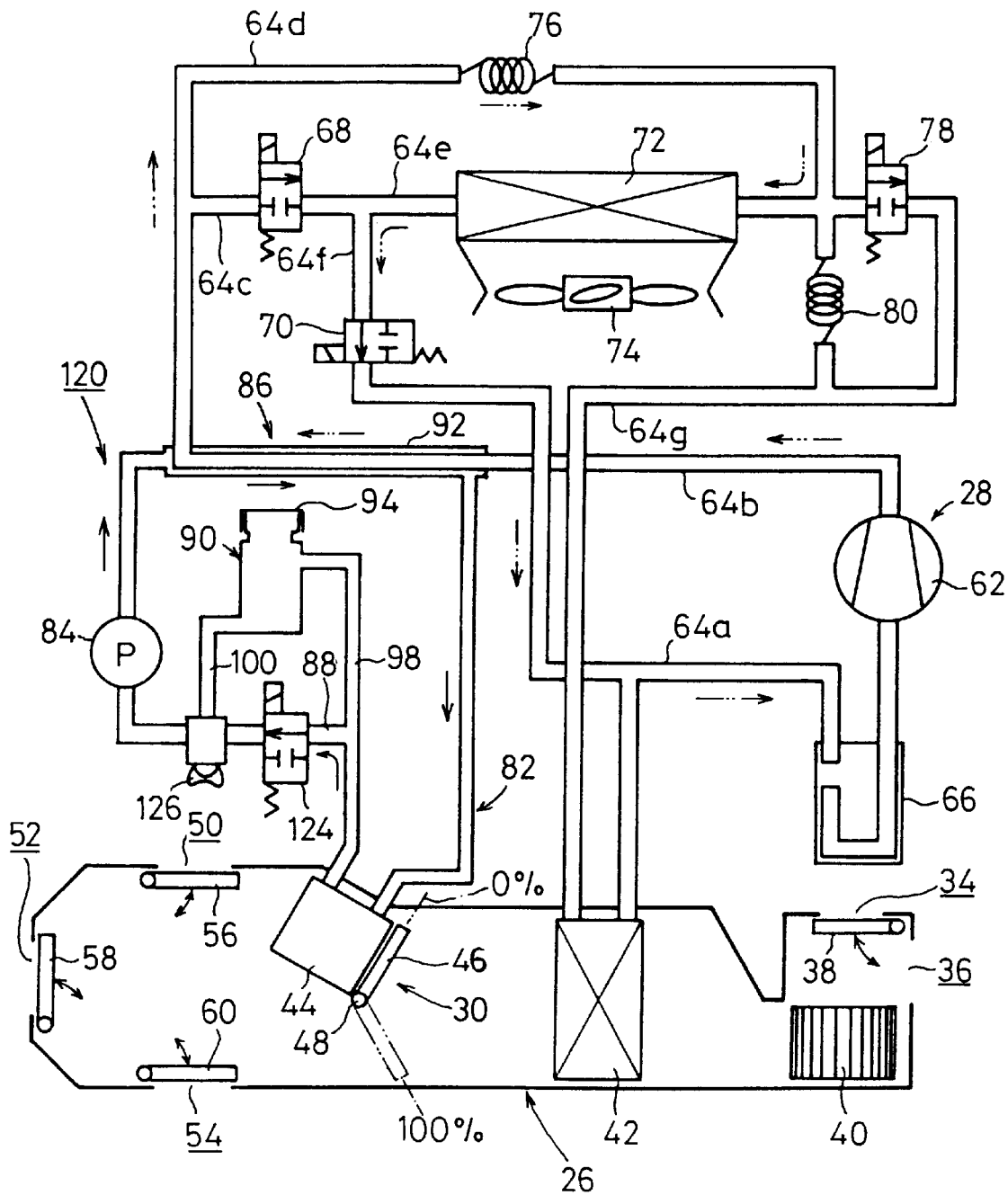
FIG. 4 is a schematic view, partly in block form, of an automatic air-conditioning system for use on an electric vehicle, into which a hot water circuit for constructing a heat exchange system according to a second embodiment of the present invention is incorporated.

FIG. 4 is a schematic view, partly in block form, of an automatic air-conditioning system 122 for use on an electric vehicle, into which a hot water circuit 120 for constructing a heat exchange system according to a second embodiment of the present invention is incorporated. The same constitutive components as those of the automatic air-conditioning system 24 according to the first embodiment are designated by the same reference numerals, detailed explanation of which will be omitted.

Figure 5:
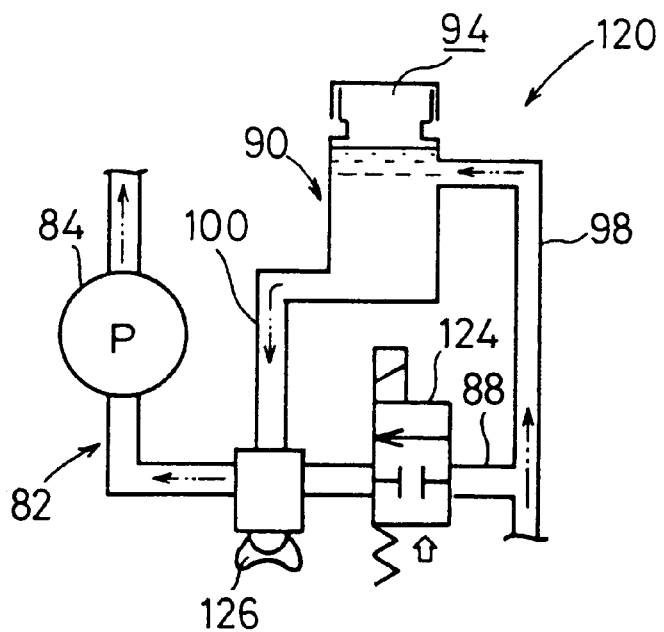
FIG. 5 is a schematic view of the circuit as depicted when water supply is performed for the hot water circuit.
Figure 6:
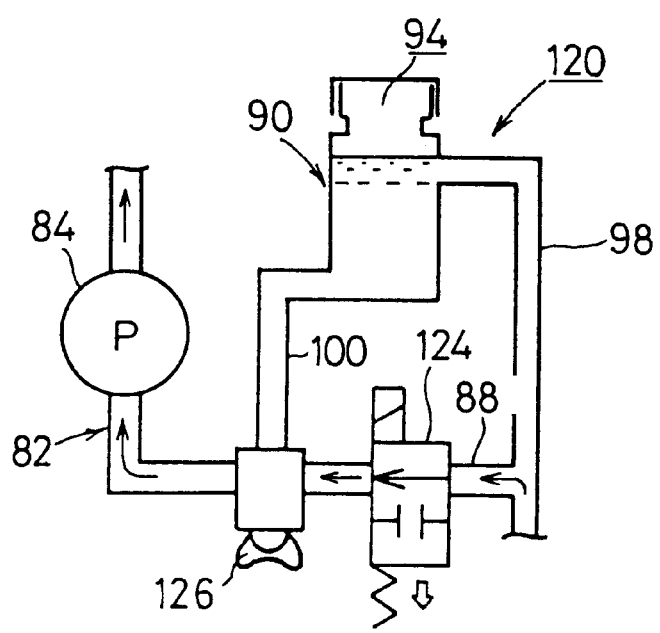
FIG. 6 is a schematic view of the circuit as depicted when heating operation is performed by using the hot water circuit.

As shown in FIGS. 4 to 6, the pipe 88 for constructing the hot water circuit 120 is arranged with an opening/shutting valve 124 such as a solenoid-operated valve as an opening/shutting unit for regulating the flow of the hot water. A drain plug 126 is detachably provided at the joined section between the pipe 88 and the second bypass pipe 100, if necessary.

In the hot water circuit 120 constructed as described above, the second bypass pipe 100 as an outflow port is disposed to make communication at a position in the vicinity of the lower portion of the reserve tank 90, while the first bypass pipe 98 as an inflow port is disposed to make communication at a position in the vicinity of the upper portion of the reserve tank 90. Therefore, when the hot water flows in a direction indicated by arrows depicted by two-dot chain lines in FIG. 5, the air in the first circulation pipe 82 can be forced out into the reserve tank 90. Therefore, the system of the present invention is advantageous in that the air-vent operation from the first circulation pipe 82 can be performed smoothly and reliably.

When the opening/shutting valve 126 is opened after completion of the water supply operation, the hot water is allowed to circulate through the circulation pipe 82 as indicated by arrows in FIG. 6 by the aid of the first water pump 84. It is noted that the pipe 88, which is connected to the first and second bypass pipes 98, 100, is designed to have the uniform diameter over its entire body. Therefore, the hydrostatic pressure acting on the reserve tank 90 is equal for respective connecting portions of the first and second bypass pipes 98, 100. Thus, there is no difference in pressure between the inflow port and the outflow port of the reserve tank 90.

Accordingly, the system of the present invention is effective in that the hot water does not circulate from the circulation pipe 82 toward the reserve tank 90, it is possible to advantageously avoid heat radiation from the reserve tank 90, and it is possible to reliably and easily avoid occurrence of heat loss.

As described above, it is enough in the second embodiment that the hot water circuit 120 provided with the reserve tank 90 is disposed in parallel to the circulation pipe 82, and the opening/shutting valve 126 is merely arranged in the pipe 88. The present invention is advantageous in that it is possible to effectively achieve improvement in air-vent from the circulation pipe 82 and reduction of heat loss by using the extremely simple structure.

In the second embodiment, the opening/shutting valve 126 as the solenoid-operated valve is arranged in the pipe 88. However, any valve structure may be adopted provided that the pipe 88 can be opened and closed. Further, it is also possible to adopt a cock or the like which is manually operable.

Figure 7:
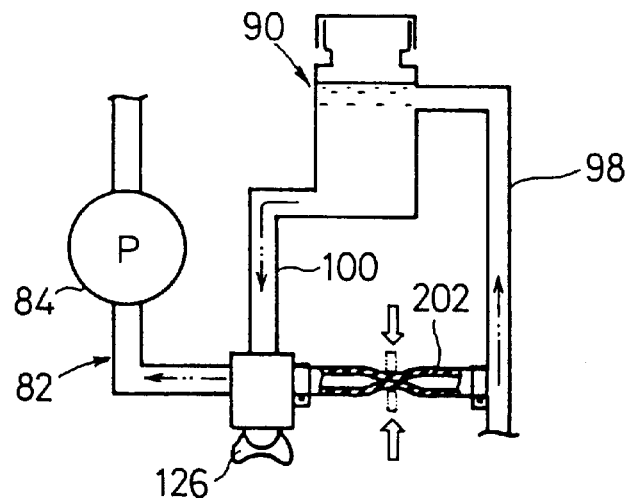
FIG. 7 is a schematic cross-sectional view, partly in block form, of major parts of a hot water circuit for constructing a heat exchange system according to a third embodiment of the present invention.

FIG. 7 is a schematic view, partly in block form, of a hot water circuit 200 for constructing a heat exchange system according to a third embodiment of the present invention. The same constitutive components as those of the hot water circuit 120 according to the second embodiment are designated by the same reference numerals, detailed explanation of which will be omitted.

In the hot water circuit 200, at least a part of a pipe 202, which is connected to the first and second bypass pipes 98, 100, is formed of a flexible resilient member. Specifically, the pipe 202 is composed of, for example, EPDM (ethylene propylene rubber) having heat resistance, weather resistance, and heat insulation.

Figure 8:
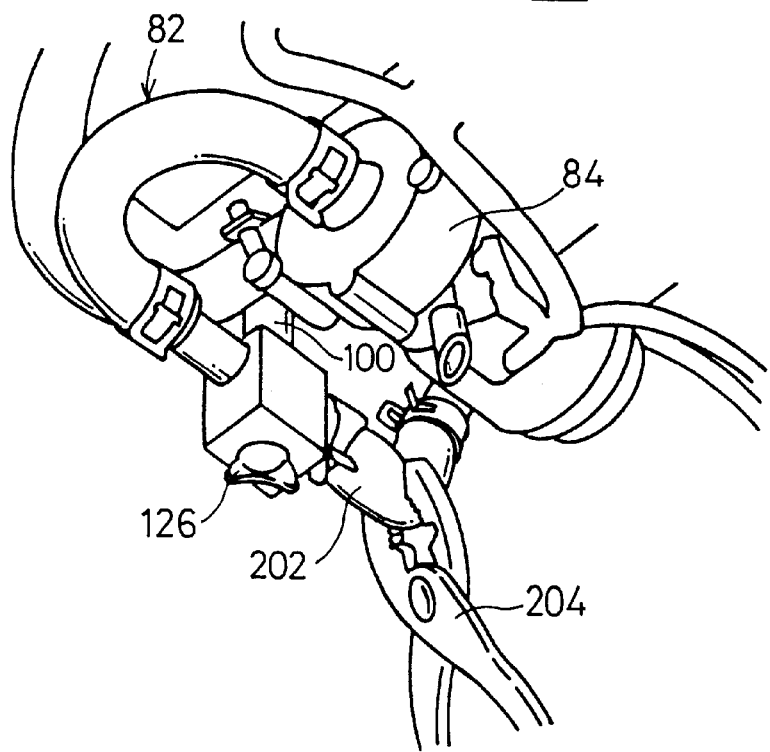
FIG. 8 is a schematic view of an operation for closing a pipe of the heat exchange system.

As shown in FIG. 8, in the hot water circuit 200 constructed as described above, the pipe 202 is grasped by a tool 204 such as pliers. Thus, the water is supplied from the reserve tank 90 in a state in which the pipe 202 is closed. After completion of the water supply operation, when the grasped state effected by the tool 204 is canceled, the pipe 202 is released by the aid of the resilient force of itself and the pressure of the hot water. Accordingly, the hot water is allowed to circulate through the circulation pipe 82.

Therefore, the third embodiment is advantageous in that the structure is further simplified, in addition to the fact that the same effect as that obtained in the second embodiment is obtained. In order to prevent the pipe 202 from any damage, it is desirable to apply an artifice such as selection of the tool 202 or any cloth wound around the pipe 202.

As described above, the heat exchange system for the electric vehicle according to the present invention is provided with the heating hot water circuit for discharging hot air into the passenger's compartment, and the cooling circuit for cooling the driving motor and the battery, in which it is possible to supplement and drain water by using the single reserve tank to the hot water circuit and the cooling circuit having different water temperatures respectively. Therefore, the number of parts or components can be reduced, and the production cost can be effectively reduced, as compared with those having reserve tanks which are individually provided for the hot water circuit and the cooling circuit respectively. Further, it is enough that the water supply operation to the reserve tank is performed once, making it possible to effectively improve the operability.

In the present invention, when water is supplied to the reserve tank which constructs the hot water circuit, in the state in which the pipe for constructing the circulation pipe for circulating hot water is closed, the water is fed to the circulation pipe while the reserve tank forms the series circuit together with the circulation pipe. The reserve tank has the inflow port which is provided in the vicinity of the upper portion thereof, and the outflow port which is provided in the vicinity of the lower portion thereof. Therefore, the air in the circulation pipe can be forced out into the hot water tank smoothly. Thus, the air-vent performance is effectively improved.

When the pipe is opened, the circulation pipe and the hot water circuit form the parallel circuit, in which the hot water flowing through the circulation pipe does not circulate through the hot water circuit. Accordingly, heat radiation does not occur, which would be otherwise caused by circulation of hot water into the reserve tank. Thus, it is possible to effectively avoid any heat loss.

What is claimed is:

1. A heat exchange system for an electric vehicle, comprising:

a heating hot water circuit for heating, with hot water, air to a predetermined temperature before being discharged into a passenger's compartment; and a cooling circuit for cooling, with cooling water, a driving motor and a battery for supplying electric energy to said driving motor, said hot water circuit comprising:

a first pump for circulating said hot water through a first circulation pipe;

a heating unit for heating said hot water circulating through said first circulation pipe;

a first heat exchanger for heating said air by means of heat exchange effected between said hot water and said air before being discharged into said passenger's compartment; and a reserve tank provided at its upper end with a water supply port, for constructing a parallel hot water circuit together with a pipe which forms a part of said first circulation pipe, and said cooling circuit comprising:

a second pump for circulating said cooling water through a second circulation pipe;

a second heat exchanger for cooling said cooling water; and a water pipe for making communication between an upper portion of said second heat exchanger and said reserve tank.

2. The heat exchange system according to claim 1, wherein said hot water circuit includes:

a first inflow bypass pipe having one end which communicates with said pipe and another end which communicates with a portion disposed in the vicinity of an upper portion of said reserve tank; and a second outflow bypass pipe having one end which communicates with said pipe and another end which communicates with a portion disposed in the vicinity of a lower portion of said reserve tank, wherein:

said reserve tank is arranged above said pipe.

3. The heat exchange system according to claim 2, wherein an opening/shutting unit for regulating flow of said hot water is disposed for said pipe for constructing said parallel hot water circuit together with said reserve tank between said first and second bypass pipes.

4. The heat exchange system according to claim 3, wherein said opening/shutting unit comprises an opening/shutting valve for opening and closing said pipe.

5. The heat exchange system according to claim 2, wherein at least a part of said pipe, which constructs said parallel hot water circuit together with said reserve tank between said first and second bypass pipes, is formed of a resilient member having flexibility.

6. A heat exchange system for an electric vehicle, provided with a heating hot water circuit for heating, with hot water, air to a predetermined temperature before being discharged into a passenger's compartment, said hot water circuit comprising:

a pump for circulating said hot water through a circulation pipe;

a heating unit for heating said hot water circulating through said circulation pipe;

a heat exchanger for heating said air by means of heat exchange effected between said hot water and said air before being discharged into said passenger's compartment;

a reserve tank provided at its upper end with a water supply port and disposed in parallel to a pipe for constructing said circulation pipe;

a first bypass pipe having one end which communicates with said pipe and another end which communicates with a portion disposed in the vicinity of an upper portion of said reserve tank; and a second bypass pipe having one end which communicates with said pipe and another end which communicates with a portion disposed in the vicinity of a lower portion of said reserve tank, wherein:

an opening/shutting unit for regulating flow of said hot water is disposed for said pipe for constructing said parallel hot water circuit together with said reserve tank between said first and second bypass pipes.

7. The heat exchange system according to claim 6, wherein said opening/shutting unit comprises an opening/shutting valve for opening and closing said pipe.

8. A heat exchange system for an electric vehicle, provided with a heating hot water circuit for heating, with hot water, air to a predetermined temperature before being discharged into a passenger's compartment, said hot water circuit comprising:

a pump for circulating said hot water through a circulation pipe;

a heating unit for heating said hot water circulating through said circulation pipe;

a heat exchanger for heating said air by means of heat exchange effected between said hot water and said air before being discharged into said passenger's compartment;

a reserve tank provided at its upper end with a water supply port and disposed in parallel to a pipe for constructing said circulation pipe;

a first bypass pipe having one end which communicates with said pipe and another end which communicates with a portion disposed in the vicinity of an upper portion of said reserve tank; and a second bypass pipe having one end which communicates with said pipe and another end which communicates with a portion disposed in the vicinity of a lower portion of said reserve tank, wherein:

at least a part of said pipe, which constructs said parallel hot water circuit together with said reserve tank between said first and second bypass pipes, is formed of a resilient member having flexibility.

\* \* \* \* \*